United States Patent
Katashiba et al.

(10) Patent No.: US 6,755,017 B2
(45) Date of Patent: Jun. 29, 2004

(54) DEVICE FOR PURIFYING EXHAUST GAS OF AN INTERNAL COMBUSTION ENGINE

(75) Inventors: Hideaki Katashiba, Tokyo (JP); Satoshi Wachi, Tokyo (JP); Kenro Mitsuda, Tokyo (JP); Kouji Hamano, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 269 days.

(21) Appl. No.: 09/899,985

(22) Filed: Jul. 9, 2001

(65) Prior Publication Data

US 2002/0073692 A1 Jun. 20, 2002

(30) Foreign Application Priority Data

Dec. 19, 2000 (JP) .......................................... 2000-385164

(51) Int. Cl.[7] ................................................ F01N 3/10
(52) U.S. Cl. ............................. 60/301; 60/286; 60/295; 60/297; 60/275
(58) Field of Search .......................... 60/274, 275, 278, 60/286, 295, 301, 297, 303; 423/213.2, 213.5

(56) References Cited

U.S. PATENT DOCUMENTS

| | | | | |
|---|---|---|---|---|
| 5,272,871 A | * | 12/1993 | Oshima et al. ............... | 60/286 |
| 5,388,406 A | * | 2/1995 | Takeshima et al. ........... | 60/301 |
| 5,412,946 A | * | 5/1995 | Oshima et al. ................ | 60/286 |
| 5,628,186 A | * | 5/1997 | Schmelz ....................... | 60/286 |
| 5,643,536 A | * | 7/1997 | Schmelz ....................... | 60/286 |
| 5,746,052 A | * | 5/1998 | Kinugasa et al. ............. | 60/274 |
| 5,806,310 A | * | 9/1998 | Daidou et al. ................ | 60/286 |
| 5,950,422 A | * | 9/1999 | Dölling ........................ | 60/286 |
| 6,041,594 A | * | 3/2000 | Brenner et al. ............... | 60/286 |
| 6,116,208 A | * | 9/2000 | Nishimura et al. ........... | 60/278 |
| 6,119,448 A | * | 9/2000 | Emmerling et al. .......... | 60/286 |
| 6,122,909 A | * | 9/2000 | Murphy et al. ............... | 60/286 |
| 6,155,044 A | * | 12/2000 | Kaiho et al. .................. | 60/301 |

FOREIGN PATENT DOCUMENTS

| | | |
|---|---|---|
| JP | 2 600 492 | 1/1997 |
| JP | 2001-145820 | 5/2001 |

* cited by examiner

Primary Examiner—Thomas Denion
Assistant Examiner—Tu M. Nguyen
(74) Attorney, Agent, or Firm—Sughrue Mion, PLLC

(57) ABSTRACT

A device for purifying exhaust gas of an internal combustion engine which provides improved purifying efficiency even in a lean operating condition without deteriorating the fuel efficiency. The device includes an electrochemical catalyst 5 installed in the exhaust system 3 of the internal combustion engine 1, the electro chemical catalyst 5 containing an electron conducting substance and an ion conducting substance, the oxidizing reaction and the reducing reaction being promoted by the conduction of ions and electrons, thereby to electrochemically purify the exhaust gas G in the exhaust system.

12 Claims, 6 Drawing Sheets

DEVICE FOR PURIFYING EXHAUST GAS OF AN INTERNAL COMBUSTION ENGINE

BACKGROUND OF THE INVENTION

1. Field of the Invention

The present invention relates to a device for purifying exhaust gas of an internal combustion engine featuring an improved NOx purifying efficiency even in a lean operating condition without deteriorating the fuel efficiency, as a result of using an electrochemical catalyst as a catalyst for purifying harmful gases (NOx).

2. Prior Art

The exhaust pipe of an internal combustion engine is usually provided with a device for purifying exhaust gas in order to purify harmful components (NOx, HC, CO, etc.) contained in the exhaust gas.

The three-way catalyst that has heretofore been extensively used works to react NOx (nitrogen oxides) generated in the stoichiometric air-fuel ratio mode operation, HC (hydrocarbons) which are the unburned fuel components, and CO (carbon monoxide) which is a component produced by the incomplete combustion, simultaneously, in order to decrease the amount of emission of NOx, HC and CO.

However, the three-way catalyst works when the engine is operating in the stoichiometric (air-fuel ratio feedback) mode but does not sufficiently work in the lean mode (excess of $O_2$ state) or in the rich mode (lack of $O_2$ state).

In recent years, in particular, the operation in the lean mode has been widely adopted from the standpoint of improving fuel efficiency, and it has been urged to efficiently purify the exhaust gas in the lean operation condition.

In order to purify the exhaust gases in the lean operation condition, therefore, it has been proposed to dispose a NOx occlusion-type catalyst (NOx occluding catalyst) on the down stream of the three-way catalyst in order to occlude NOx that was not all reduced by the three-way catalyst.

However, NOx occluded by the NOx occluding catalyst during the lean operating condition must be reduced with reducing agents (HC, CO). For this purpose, the engine operating condition after the occlusion of NOx must be forcibly controlled from the lean mode into the rich mode, resulting in a drop in the fuel efficiency.

In order to purify NOx in the lean mode, further, it has been proposed to use a selection-type NOx purifying catalyst (selectively reducing catalyst) in addition to using the three-way catalyst.

However, the selectively reducing catalyst works to purity NOx in the lean mode but its poor purifying efficiency is low, requiring much reducing agent for purifying NOx and without having a reducing agent-adsorbing function for adsorbing the reducing agent.

When the selectively reducing catalyst is installed on the downstream of the three-way catalyst, therefore, no NOx reducing agent flows to the downstream of the three-way catalyst in the lean mode. Due to the lack of the reducing agent, therefore, the selectively reducing catalyst fails to properly work, and it becomes difficult to reduce the amount of emission of NOx.

It further becomes necessary to provide a device (device for feeding atomized gas of fuel) for feeding a NOx reducing agent (HC) to the selectively reducing catalyst in the lean atmosphere. However, since the selectively reducing catalyst has no function for adsorbing the reducing agent, the NOx reducing agent must be continuously fed, requiring fuel in large amounts and deteriorating the fuel efficiency.

Besides, even if a reducing agent adsorbing member is added to the selectively reducing catalyst, most of the reducing agent that is adsorbed reacts with oxygen in the air. Accordingly, only the unreacted reducing agent is used for the purification of NOx; i.e., only a small proportion of the reducing agent is used.

When the selectively reducing catalyst is installed on the upstream of the three-way catalyst, on the other hand, the function for purifying the NOx is maintained by the selectively reducing catalyst in the lean mode. Immediately after the start of the engine (rich mode), however, an extended period of time is required until the three-way catalyst on the downstream side reaches an activating temperature. Thus, the three-way catalyst fails to work to a sufficient degree, and it becomes difficult to decrease the amounts of emission of HC and CO.

In order to pass the regulations on the exhaust gases that are becoming stringent in recent years, further, activation of the three-way catalyst must be promoted right after the start and, hence, the three-way catalyst must be placed just under the engine.

Therefore, the selectively reducing catalyst is inevitably installed on the downstream of the three-way catalyst, and the NOx reducing agents (HC, CO) necessary for the selectively reducing catalyst may not be sufficiently fed under the lean operating condition.

In the conventional device for purifying exhaust gas of an internal combustion engine as described above, use of the three-way catalyst only is not enough for purifying NOx to a sufficient degree in the lean operating condition. When the NOx occluding catalyst is used in combination, the rich operating condition must be repetitively established to reduce NOx that is occluded resulting in a decrease in the fuel efficiency.

When the selectively reducing catalyst is installed on the downstream of the three-way catalyst, on the other hand, it becomes necessary to use a device for feeding a reducing agent, since the selectively reducing catalyst has a poor purifying efficiency, resulting in a decrease in the fuel efficiency, too.

When the selectively reducing catalyst is installed on the upstream of the three-way catalyst, an extended period of time is required until the three-way catalyst reaches the activating temperature. At the start, therefore, the three-way catalyst cannot exhibit its function of purification.

SUMMARY OF THE INVENTION

The present invention was accomplished in order to solve the above-mentioned problems, and has an object of providing a device for purifying exhaust gas of an internal combustion engine which features an improved purifying efficiency even in a lean operating condition without deteriorating the fuel efficiency, as a result of installing an electrochemical catalyst on the downstream of the three-way catalyst.

A device for purifying exhaust gas of an internal combustion according to the present invention comprises an electrochemical catalyst installed in the exhaust system of the internal combustion engine, the electrochemical catalyst containing an electron conducting substance and an ion conducting substance, the oxidizing reaction and the reducing reaction being promoted by the conduction of ions and electrons, thereby to electrochemically purify the exhaust gas in the exhaust system.

In the device for purifying exhaust gas of an internal combustion engine according to the present invention, the electrochemical catalyst contains at least either a NOx occluding member or an HC adsorbing member.

In the device for purifying exhaust gas of an internal combustion engine according to the present invention, further, a reducing agent feeding device is installed in the exhaust system of the internal combustion engine just on the upstream of the electrochemical catalyst to feed a NOx reducing agent into the exhaust system.

In the device for purifying exhaust gas of an internal combustion engine according to the present invention, the reducing agent feeding device feeds an atomized gas of fuel from the fuel tank as the NOx reducing agent.

In the device for purifying exhaust gas of an internal combustion engine according to the present invention, the reducing agent feeding device includes:

a canister for adsorbing the atomized gas of fuel; and a reducing agent feed control valve for feeding the atomized gas of fuel adsorbed by the canister to the exhaust system of the internal combustion engine as the NOx reducing agent; and wherein, the time for opening the reducing agent feed control valve is controlled depending upon the amount of the NOx reducing agent required by the electrochemical catalyst.

In the device for purifying exhaust gas of an internal combustion engine according to the present invention, the reducing agent feeding device feeds the fuel in the fuel tank as the NOx reducing agent.

In the device for purifying exhaust gas of an internal combustion engine according to the present invention, the reducing agent feeding device includes:

a fuel pump for feeding the fuel in the fuel tank while adjusting the pressure thereof to assume a predetermined value; and a reducing agent feeding injector for feeding the fuel from the fuel pump as the NOx reducing agent into the exhaust system of the internal combustion engine; wherein, the time for driving the reducing agent feeding injector is controlled depending upon the amount of the NOx reducing agent required by the electrochemical catalyst.

In the device for purifying exhaust gas of an internal combustion engine according to the present invention, the reducing agent feeding device feeds the fuel after reformed as the NOx reducing agent.

In the device for purifying exhaust gas of an internal combustion engine according to the present invention, the reducing agent feeding device includes:

a fuel pump for feeding the fuel in the fuel tank while adjusting the pressure thereof to assume a predetermined value;

a fuel reforming device for reforming the fuel fed from the fuel pump into $H_2$; and a feed amount control device for feeding $H_2$ as the NOx reducing agent into the exhaust system of the internal combustion engine; wherein, the feeding amount of the NOx reducing agent is controlled by the feed amount control device depending upon the amount of the NOx reducing agent required by the electrochemical catalyst.

Further, a device for purifying exhaust gas of an internal combustion engine according to the present invention comprises:

exhaust gas amount estimating means for estimating the amount of the exhaust gas containing NOx, HC and CO exhausted into the exhaust system of the internal combustion engine;

electrochemical catalyst state judging means for judging the active state of the electrochemical catalyst based upon the temperature data of the electrochemical catalyst; and reducing agent feed judging means for estimating the reacting state of the electrochemical catalyst with the NOx relying upon the active state of the electrochemical catalyst, reaction rate thereof and storage of the exhaust gas by the electrochemical catalyst, and for judging whether the NOx reducing agent needs be fed based upon the values estimated by the exhaust gas amount estimating means;

wherein when it is so judged that the NOx reducing agent needs be fed, the reducing agent feed judging means drives the reducing agent feeding device.

In the device for purifying exhaust gas of an internal combustion engine according to the present invention, provision is made of sensor means for detecting at least one operating condition out of the rotational speed of the internal combustion engine, load condition and cooling water temperature, and wherein the exhaust gas amount estimating means estimates the amount of the exhaust gas depending upon the operating condition of the internal combustion engine.

In the device for purifying exhaust gas of an internal combustion engine according to the present invention, provision is made of first and second three-way catalysts in the exhaust system of the internal combustion engine, the first three-way catalyst being installed on the upstream of the electrochemical catalyst and the second three-way catalyst being installed on the downstream of the electrochemical catalyst.

In the device for purifying exhaust gas of an internal combustion engine according to the present invention, the internal combustion engine is controlled for its operation in a lean mode.

DESCRIPTION OF THE PREFERRED EMBODIMENTS

Embodiment 1

Figure 1:
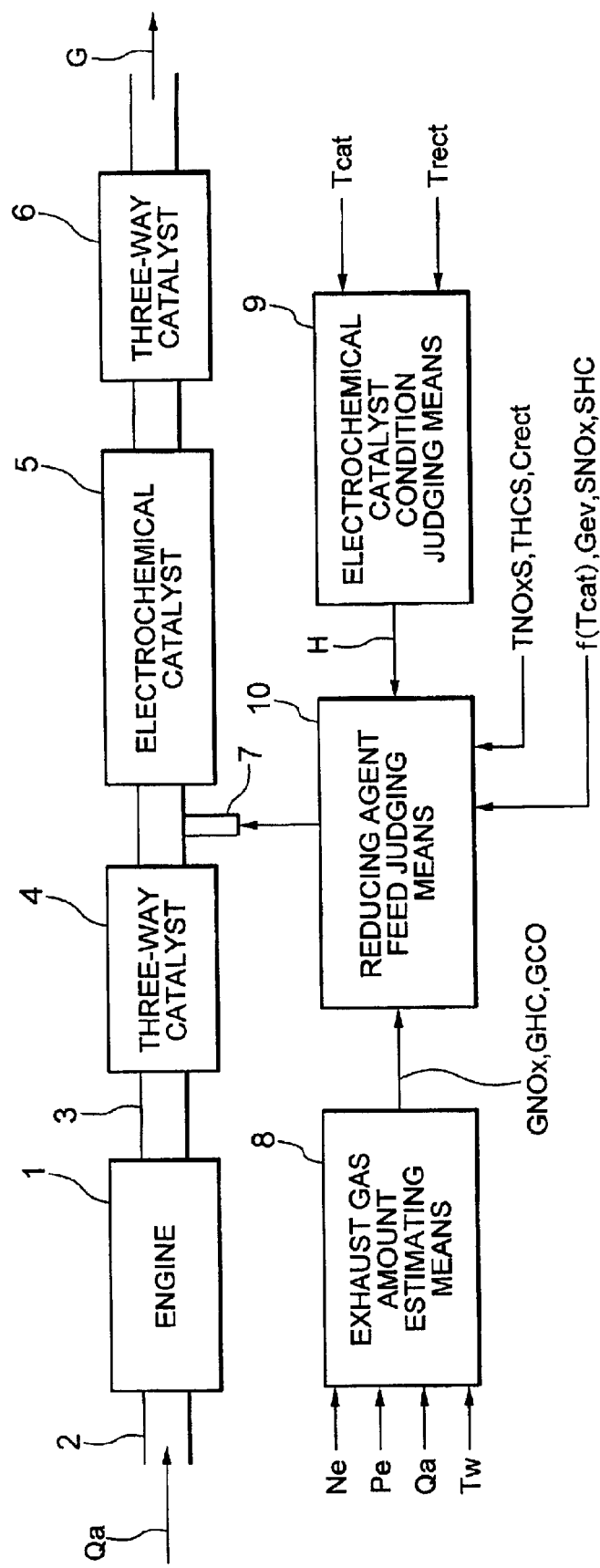
FIG. 1 is a block diagram illustrating the constitution of an embodiment 1 according to the present invention.

An embodiment 1 of the present invention will now be described in detail with reference to the drawings. FIG. 1 is a block diagram illustrating the constitution of the embodiment 1 of the present invention. In FIG. 1, an internal combustion engine or an engine 1 is provided with an intake pipe 2 for taking the air in and an exhaust pipe 3 for exhausting the exhaust gas after the combustion.

Though not diagramed here, the intake pipe 2 is provided with a throttle valve for adjusting the intake air amount Qa and injectors for injecting the fuel. The engine 1 is provided with combustion chambers in which the mixture is compressed, spark plugs for exploding the mixture in the combustion chambers, and a crank shaft for transmitting the output of explosion to the drive wheels of a vehicle.

Various sensor means (crank angle sensor, rotation sensor, air flow sensor, intracylinder pressure sensor, cooling water temperature sensor, air-fuel ratio sensor, catalyst temperature sensor and the like sensors) are provided around the engine 1, three-way catalyst 4 and electrochemical catalyst 5, to collect the data related to the operating conditions of the engine 1. The sensor data are input to an electronic control unit (ECU) that is not shown.

Right under the exhaust pipe 3 is provided the three-way catalyst 4 for purifying the exhaust gas G, particularly, at the time of start. On the downstream of the three-way catalyst 4, there is provided the electrochemical catalyst 5 for purifying NOx contained in the exhaust gas G.

The electrochemical catalyst 5 contains at least either a NOx occluding member or an HC adsorbing member as well as an electron conducting substance and an ion conducting substance, promotes the oxidizing reaction and the reducing reaction owing to the conduction of ions and electrons, and electrochemically purifies the exhaust gas in the exhaust system.

On the downstream of the electrochemical catalyst 5, there is provided another three-way catalyst 6 for purifying, in large amounts, the three components, i.e., NOx, HC and CO in the exhaust gas G in the stoichiometric air-fuel ratio operating condition (stoichiometric mode).

A reducing agent feeding device 7 is provided between the three-way catalyst 4 and the electrochemical catalyst 5 just on the upstream of the electrochemical catalyst 5. In response to a control instruction from reducing agent feed judging means 10 (described later), the reducing agent feeding device 7 feeds the reducing agent necessary for purifying the NOx from the upstream of the electrochemical catalyst 5.

Exhaust gas amount estimating means 8 estimates the amounts of the components (NOx emission amount GNOx, HC emission amount GHC, CO emission amount GCO) in the exhaust gases G (NOx, HC, CO) discharged into the exhaust pipe 3 depending upon the operating conditions of the engine 1.

The data of operating conditions which the exhaust gas amount estimating means 8 uses for estimating the amounts of the exhaust gases, include at least one sensor data such as engine rotational speed Ne, intracylinder pressure Pe representing the load condition, intake air amount Qa, and cooling water temperature Tw.

Electrochemical catalyst condition judging means 9 judges the active state H of the electrochemical catalyst based on the temperature data (catalyst temperature Tcat and activating temperature Trect) of the electrochemical catalyst 5.

Reducing agent feed judging means 10 estimates the reaction condition of the electrochemical catalyst 5 with NOx based upon the active state H, reaction rate and the exhaust gas storage condition of the electrochemical catalyst 5, and judges the necessity for feeding the NOx reducing agent HC based upon the values GHOX, GHC and GCO estimated by the exhaust gas amount estimating means 8.

Namely, based upon the active state H of the electrochemical catalyst 5, the reducing agent feed judging means 10 estimates the NOx and HC storage condition of the electrochemical catalyst 5 and the NOx purifying reaction rate (reaction condition) of the electrochemical catalyst 5 from the occluding and adsorbing performance (maximum NOx adsorbed amount SNOx and maximum HC adsorbed amount SHC) of the electrochemical catalyst 5.

Based upon the active state H of the electrochemical catalyst 5 and the estimated values (NOx emission amount GNOx, HC emission amount GHC and CO emission amount GCO) of the exhaust gas amounts, further, the reducing agent feed judging means 10 judges whether it is necessary to feed the reducing agent HC for purifying NOx.

When it is judged that the NOx reducing agent must be fed, the reducing agent feed judging means 10 calculates the required reducing agent feeding amount, and drives the reducing agent feeding device 7 depending upon the required feeding amount.

The exhaust gas amount estimating means 8, electrochemical catalyst condition judging means 9 and reducing agent feed judging means 10 are constituted by ECUs which are microcomputers like the engine control means.

Concretely described below is a principle of the oxidizing/reducing reaction based upon the migration of ions in the electrochemical catalyst 5 through a solid electrolyte and upon the migration of electrons through the electron conducting substance.

In the electrochemical catalyst 5, the surface of a noble metal selectively occluding NOx is joined to the surface of a noble metal selectively adsorbing the NOx reducing agents (HC, CO) through the solid electrolyte and the electron conducting substance. Ions and electrons are conducted across these noble metals to promote the oxidizing/reducing reaction.

Here, to trigger the electrochemical reaction, the NOx and the NOx reducing agent HC must be selectively occluded and adsorbed by the surfaces of separate noble metals. To realize this, it is necessary to provide both the NOx occluding member and the HC adsorbing member.

Next, properties of the electrochemical catalyst 5 are described below while clarifying differences from the above-mentioned NOx occluding catalyst and the NOx selectively reducing catalyst from the standpoint of control and performance.

When the electrochemical catalyst is compared with the NOx occluding catalyst, the electrochemical catalyst 5 maintains a NOx purifying performance higher than that of the NOx occluding catalyst in an oxygen rich atmosphere (lean mode).

Unlike that of the NOx occluding catalyst, therefore, the electrochemical catalyst 5 needs not occlude the NOx in a lean air-fuel ratio state or needs not release the NOx in a rich state to purify the NOx by reduction. Therefore, the air-fuel ratio needs not be greatly shifted toward the rich side.

That is, unlike purifying the NOx by the NOx occluding catalyst, the electrochemical catalyst 5 does not require the air-fuel ratio to be frequently shifted to the rich side, and the consumption of fuel can be suppressed.

When the electrochemical catalyst 5 is compared with the selectively reducing catalyst, the electrochemical catalyst 5 exhibits a purifying efficiency higher than that of the selectively reducing catalyst and makes it possible to add a reducing agent adsorbing function. Therefore, the reducing agent needs be fed in a small amount in a lean atmosphere, and the fuel efficiency is not deteriorated.

In the case of the electrochemical catalyst 5, the NOx reducing agent can be fed by the conduction of electrons and ions even on the catalyst surfaces which are not the same. Accordingly, the NOx can be reduced to a sufficient degree even with a reducing gas of a concentration lower than that needed for the selectively reducing catalyst.

Accordingly, the electrochemical catalyst 5 functions to a sufficient degree even when it is installed on the downstream of the three-way catalyst, and the reducing agent feeding device 7 of a simple constitution suffices for the need.

Next, concrete operation of the embodiment 1 of the present invention shown in FIG. 1 will be described concerning a processing for purifying the NOx that varies depending upon the operating conditions right after the start of the engine 1 with reference to FIG. 2.

Figure 2:
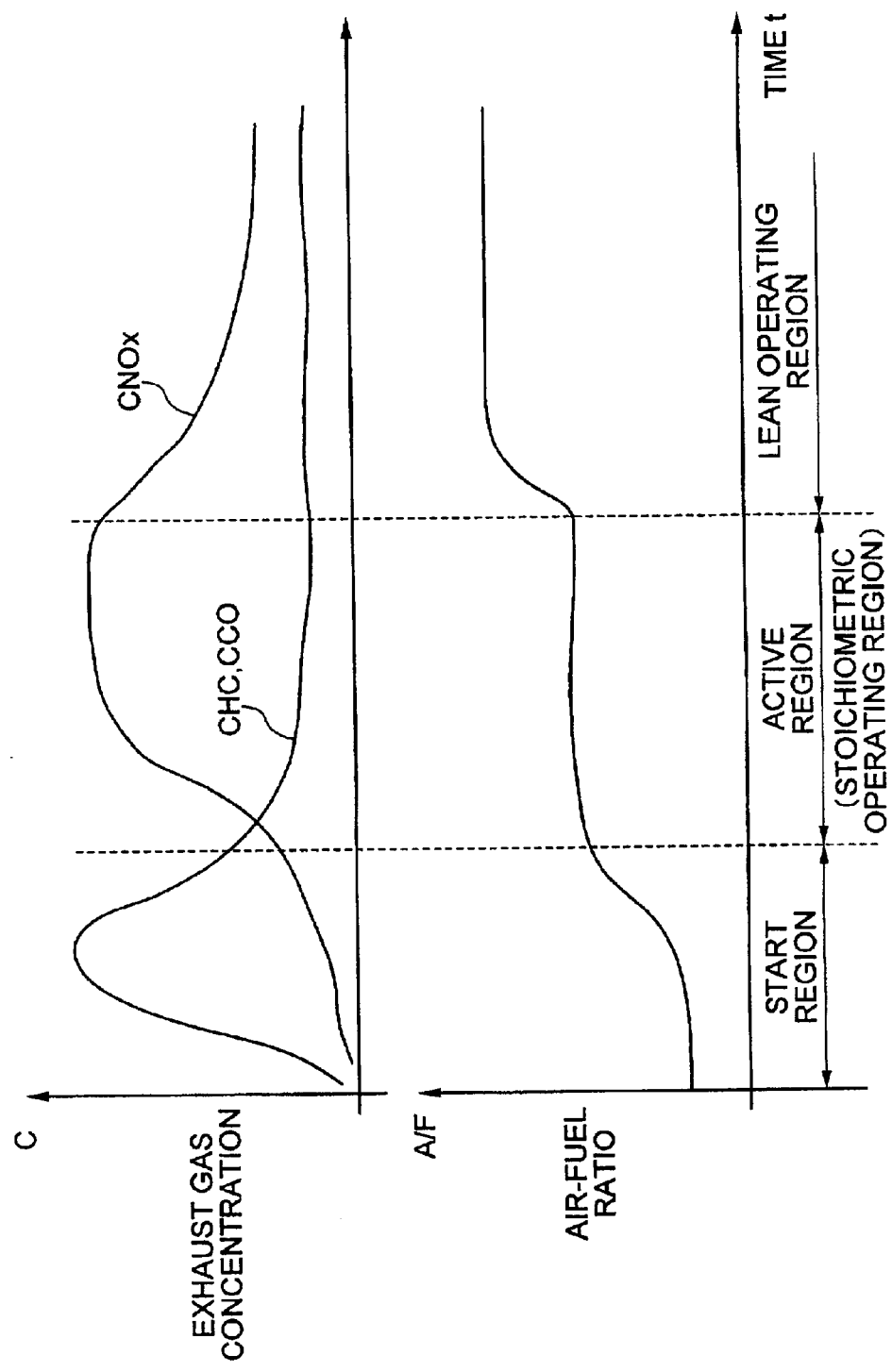
FIG. 2 is a timing chart illustrating a change in the air-fuel ratio and a change in the amount of the exhaust gas components right after the start of the engine.

FIG. 2 is a timing chart illustrating a change in the air-fuel ratio and a change in the amount of emission of exhaust gas components right after the start of the engine 1.

In FIG. 2, the ordinate represents a change in the concentrations CNOx and CHC (CCO) of the components in the exhaust gases (NOx, HC, CO) with the passage of time and a change in the air-fuel ratio A/F of the engine 1 (weight ratio of the intake air amount Qa and the fuel amount fed to the engine 1) with the passage of time.

The NOx emission concentration CNOx increases as the engine 1 is warmed up (as the combustion temperature rises), while the HC emission concentration CHC and the CO emission concentration CCO exhibit nearly the same tendency, i.e., sharply rises immediately after the start and, then, decreases.

In the start region (operating condition right after the start) in FIG. 2, the operation is conducted in a rich air-fuel ratio mode so will not to deteriorate the driveability and to realize a stable combustion while maintaining starting performance of the engine 1.

In the start region, therefore, the HC and CO emission concentrations CHC and CCO are high in the exhaust gases, and the NOx emission concentration CNOx is low.

Under a temperature condition in the start region, the temperature of the electrochemical catalyst 5 has not been raised up to the activating temperature Trect at which the NOx purifying reaction occurs, the HC adsorbing member added to the electrochemical catalyst 5 is adsorbing HC only, and no electrochemical reaction for purifying the NOx takes place.

In the start region as is obvious from FIG. 2, however, the amount of NOx emission is very small and there arises no particular problem.

Then, as the engine 1 is warmed up and the air-fuel ratio becomes lean to a stoichiometric air-fuel ratio (stoichiometric mode), the electrochemical catalyst 5 enters into an active region and becomes active.

In the active region in which the engine 1 has been warmed up, the NOx emission concentration CNOx becomes high, the HC stored in the start region is used as a reducing agent, and the reaction is conducted for purifying the NOx by reduction.

When the operating condition in the active region is further continued, the stored reducing agent HC is all spent for the reaction for purifying the NOx, and the HC and CO emission amounts GHC and GCO emitted from the engine 1 are not enough for purifying the NOx. Therefore, the reducing agent feeding device 7 is driven to additionally feed the NOx reducing agent such as HC to the electrochemical catalyst 5.

When the engine after having been warmed up enters into a lean operating region after the passage of a time t, the NOx emitted from the engine 1 is occluded by the NOx occluding member added to the electrochemical catalyst 5 and is electrochemically reduced and purified with the NOx reducing agents (HC, CO) contained in the exhaust gas.

In the same manner as in the case of the active region, further, when the NOx reducing agent (HC, CO) emission amounts GHC and GCO emitted from the engine 1 are not enough for purifying the NOx even in the lean operating region, the reducing agent feed device 7 is driven to additionally feed the NOx reducing agent such as HC to the electrochemical catalyst 5.

The following advantages are exhibited upon providing the exhaust pipe 3 of the engine 1 with the three-way catalysts 4, 6 as well as the electrochemical catalyst 5 exclusively for purifying the NOx as shown in FIG. 1.

That is, the electrochemical catalyst 5 reduces the NOx relying upon an electrochemical purifying mechanism, and is capable of purifying (reducing) the NOx in the lean operating condition while efficiently using HC and CO as the NOx reducing agent. Therefore, the lean/rich control operation needs not be repetitively executed unlike that of when the NOx occluding catalyst is used, and the fuel efficiency is not deteriorated.

When the electrochemical catalyst 5 is used, further, the reducing agent feeding device 7 is necessary like when the selectively reducing catalyst is used. Owing to a high purifying efficiency, however, the NOx reducing agent needs be fed in small amounts without deteriorating the fuel efficiency.

Next, the operation of the embodiment 1 of the invention shown in FIG. 1 will be described more concretely with reference to FIG. 3.

Figure 3:
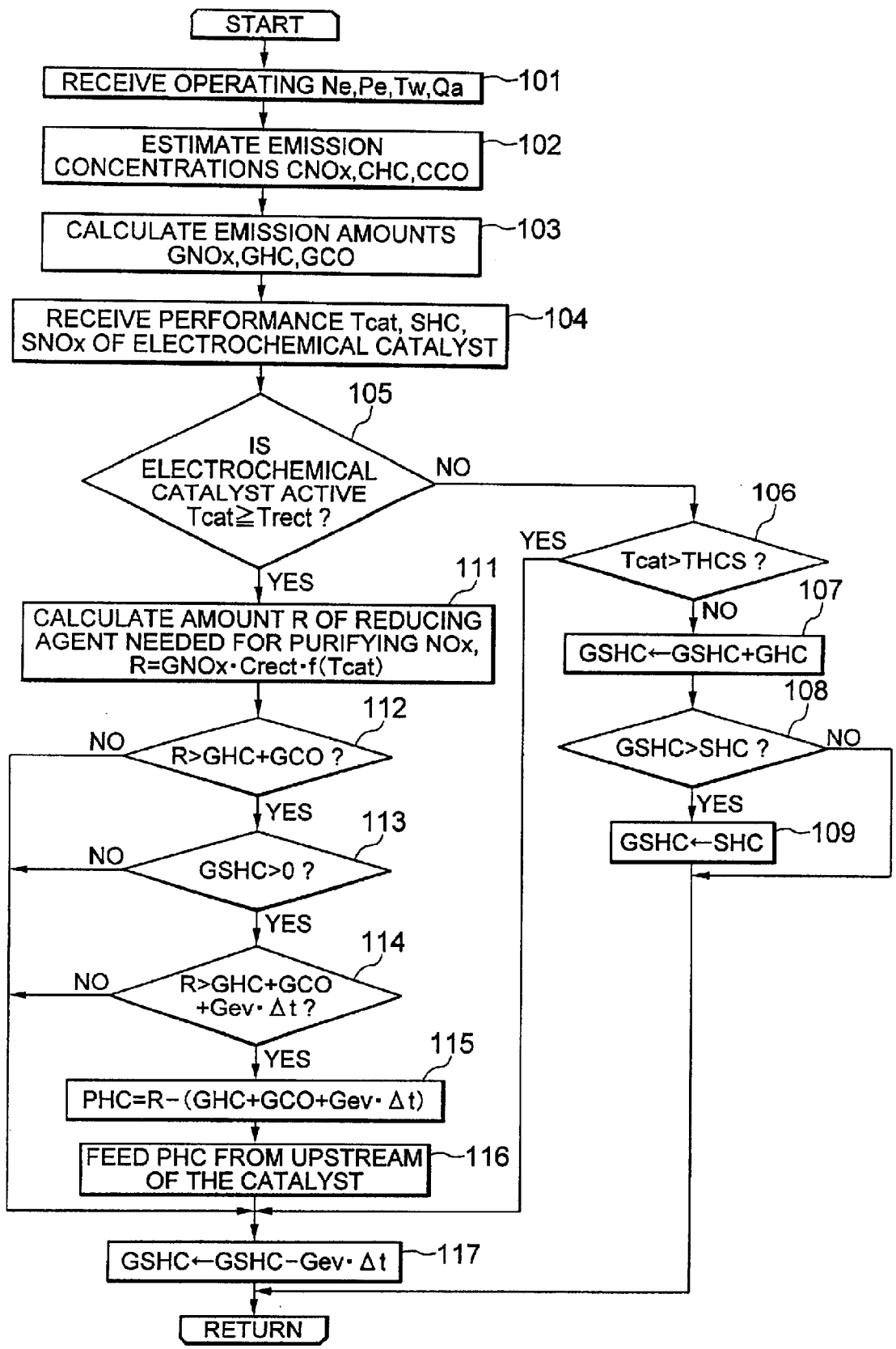
FIG. 3 is a flowchart illustrating the processing operation according to the embodiment 1 of the present invention.

FIG. 3 is a flow chart illustrating the control operation of the reducing agent feeding device 7 for functioning the electrochemical catalyst 5, and explains a procedure of processing by the exhaust gas amount estimating means 8, electrochemical catalyst condition judging means 9 and reducing agent feed judging means 10.

Here, in order to avoid complexity, FIG. 3 illustrates a case where attention is given to performance of, typically, the HC adsorbing member only for adsorbing the NOx reducing agent HC (unburned fuel) among the exhaust gas absorbing members added to the electrochemical catalyst 5.

In FIG. 3, first, the exhaust gas amount estimating means 8 in the ECU receives an engine rotational speed Ne, an intracylinder average effective pressure Pe, cooling water temperature Tw and intake air amount Qa as operating conditions of the engine 1 (step 101).

The exhaust gas amount estimating means 8, then, retrieves and operates the NOx emission concentration CNOx, HC emission concentration CHC and CO emission concentration CCO from the input data representing the operating conditions by making a reference to, for example, an exhaust gas concentration map (step 102).

Based on the intake air amount Qa, further, the emission concentrations are converted into emission gas flow rates (masses) to estimate the NOx emission amount GNOx, HC emission amount GHC and CO emission amount GCO (step 103).

The electrochemical catalyst condition judging means 9 and the reducing agent feed judging means 10 in the ECU receive the data representing the purifying performance of the electrochemical catalyst 5, in order to judge the active state H of the electrochemical catalyst 5 and to estimate the reaction condition for purification (step 104).

That is, the electrochemical catalyst condition judging means 9 receives the temperature data (catalyst temperature Tcat, activating temperature Trect) of the electrochemical catalyst 5.

The reducing agent feed judging means 10 receives exhaust gas release temperatures (NOx release temperature TNOx of the NOx occluding member, HC release temperature THCS of the SHC adsorbing member) and maximum adsorbing amounts (maximum NOx occluding amount SNOx of the NOx occluding member, maximum HC adsorbing amount SHC of the HC adsorbing member) of the exhaust gas absorbing members in the electrochemical catalyst 5, and further receives a conversion coefficient Crect, a reaction rate coefficient f (Tcat) and a release rate Gev.

Then, the electrochemical catalyst condition judging means 9 compares the catalyst temperature Tcat with the activating temperature Trect, and judges whether the catalyst temperature Tcat has reached the activating temperature Trect (whether the electrochemical catalyst 5 is active)(step 105).

When it is judged at step 105 that Tcat<Trect (i.e., NO) at step 105, the electrochemical catalyst 5 has not been activated and, hence, the electrochemical catalyst condition judging means 9 renders the signal level of the active state H to be "L". When it is judged that Tcat≧Trect (i.e., YES), the electrochemical catalyst 5 has been activated, and the signal level of the active state H is rendered to be "H".

When the judged result at step 105 is NO (the active state H output from the electrochemical catalyst state judging means 9 is of the L level), then, the reducing agent feed judging means 10 compares the catalyst temperature Tcat with the release temperature THCS (<Trect) of the HC adsorbing member, and judges whether the catalyst temperature Tcat is higher than the release temperature THCS (step 106).

When it is judged at step 106 that Tcat>THCS (i.e., YES), the HC adsorbing member in the electrochemical catalyst 5 is in a state of releasing HC. Accordingly, the reducing agent feed judging means 10 executes the processing of release operation step 117 (described later) to get out of the processing routine of FIG. 3.

Further, when it is judged at step 106 that Tcat≦THCS (i.e., NO), the HC adsorbing member is in a state of adsorbing HC. Therefore, the reducing agent feed judging means 10 adds the HC emission amount GHC estimated this time to the HC amount GSHC adsorbed up to the previous time, and updates the added value as the HC adsorbed amount GSHC that is estimated this time (step 107).

Then, the reducing agent feed judging means 10 judges whether the HC adsorbed amount GSHC updated at step 107 has exceeded a maximum HC adsorbed amount SHC (step 108). When it is judged that GSHC≦SHC (i.e., NO), the program gets out of the processing routine of FIG. 3.

When it is judged at step 108 that GSHC>SHC (i.e., YES), the reducing agent feed judging means 10 limits the HC adsorbed amount GSHC to the maximum HC adsorbed amount (step 109) to get out of the processing routine FIG. 3.

When the judged result at step 105 is YES (active state H is of the H level), on the other hand, the electrochemical catalyst 5 has been activated, and the reducing agent feed judging means 10 calculates the amount R of the reducing agent required for reducing the NOx in the electrochemical catalyst 5 depending upon the NOx emission amount GNOx in the exhaust gas in compliance with the formula (2)(step 11), $$R = GNOx \cdot Crect \cdot f(Tcat) \tag{1}$$

where Crect is a conversion coefficient for finding the amount of the reducing agent needed for purifying the NOx, and f (Tcat) is a reaction rate coefficient expressed by a function of the catalyst temperature Tcat.

In the case of the electrochemical catalyst 5, the reducing/purifying reaction takes place not only on the same catalyst surface but also between the distant catalyst surfaces and, hence, conversion coefficient Crect becomes smaller than that of the ordinary surface-reaction-type catalyst. Therefore, the required amount R of the reducing agent found from the formula (1) can be decreased to be smaller than that of when an ordinary catalyst is used.

Next, the reducing agent feed judging means 10 judges whether the required amount R of the reducing agent is larger than the HC emission amount GHC and the CO emission amount GCO in the exhaust gas (whether the amount of the exhaust gas is in short supply) (step 112).

When it is judged at step 112 that R≦GHC+GCO (i.e., NO), the purification by reduction can be accomplished with the exhaust gas amount only. Therefore, the reducing agent feed judging means 10 executes the processing of release operation step 117 (described later) to get out of the processing routine of FIG. 3.

When it is judged at step 112 that R>GHC+GCO (i.e., YES), the purification by reduction cannot be accomplished with the exhaust gas amount only. Therefore, the reducing agent feed judging means 10 judges whether there exists the HC adsorbed amount GSHC (step 113).

When it is judged at step 113 that GSHC=0 (i.e., NO), there exists no HC to be released, and the reducing agent feed judging means 10 executes the processing of release operation step 117 (described later) to get out of the processing routine of FIG. 3.

When it is judged at step 113 that GSHC>0 (i.e., YES), there exists HC that can be released and, hence, the reducing agent feed judging means 10 judges whether the required amount R of the reducing agent is larger than the amount of the NOx reducing agent after HC is released (whether the reducing agent is still insufficient despite of adding it for releasing HC)(step 114).

That is, a value obtained by adding HC released from the HC adsorbed amount GSHC to the exhaust gas amount, is compared with the required amount R of the reducing agent to judge whether the following formula (2) is satisfied, $$R > GHC + GCO + Gev \cdot \Delta t \tag{2}$$

where Δt is an operation period, and Gev is a rate of HC released from the HC adsorbing member per a unit time Δt.

When it is judged at step 114 that R≧GHC+GCO+Gev·Δt (i.e., NO), the purification by reduction is possible with the exhaust gas amount and the HC release amount only, and the reducing agent feed judging means 10 executes the processing of release operation step 117 (described later) to get out of the processing routine of FIG. 3.

Further, when it is judged at step 114 that R>GHC+GCO+Gev·Δt (i.e., YES), the purification by reduction is not still possible despite of adding the HC release amount to the exhaust gas amount. Therefore, the reducing agent feed judging means 10 finds an additional HC feed amount PHC from the reducing agent feeding device 7 (step 115) in compliance with the following formula (3)(step 115), $$PHC = R - (GHC + GCO + Gev \cdot \Delta t) \tag{3}$$

Next, the reducing agent feed judging means 10 drives the reducing agent feeding device 7 depending upon the additional HC feed amount PHC to feed the additional HC feed amount PHC from the upstream of the electrochemical catalyst 5 and to compensate for the lack of the reducing agent (step 116).

Thus, the NOx in the exhaust gas from the engine 1 is purified by reduction neither too much nor too little irrespective of the NOx emission amount GNOx.

Finally, the amount of HC (=Gev·Δt) released and consumed as the NOx reducing agent is subtracted from the HC adsorbed amount GSHC in the electrochemical catalyst 5, to update the HC adsorbed amount GSHC (step 117) and to get out of the routine of FIG. 3.

Embodiment 2

The above embodiment 1 did not refer to the concrete constitution of the reducing agent feeding device 7. However, it is also allowable to feed the atomized gas of fuel from the fuel tank into the exhaust system as the NOx reducing agent.

Figure 4:
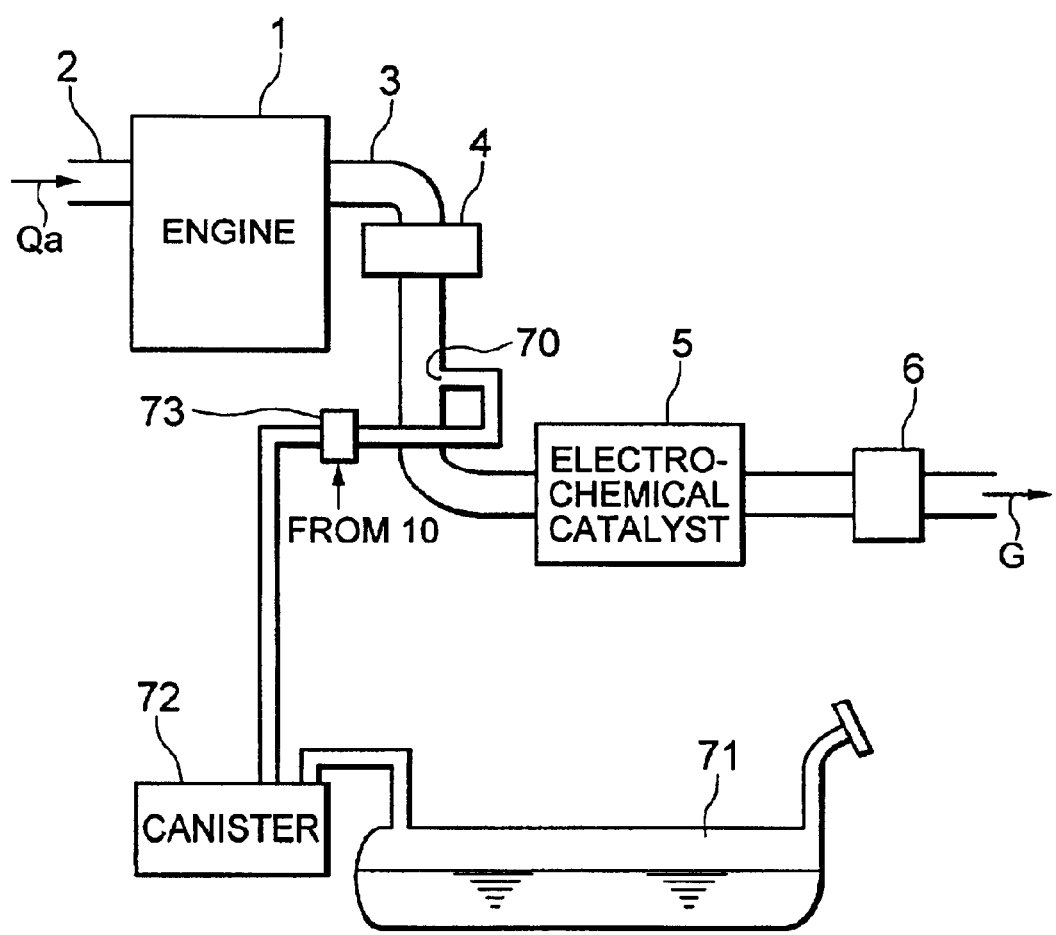
FIG. 4 is a diagram illustrating the constitution of a reducing agent feeding device according to an embodiment 2 of the present invention.

FIG. 4 is a diagram illustrating the constitution of the periphery of the reducing agent feeding device 7 according to the embodiment 2 of the invention using the atomized gas of fuel as the NOx reducing agent. The same portions as those described above are denoted by the same reference numerals but are not described here again in detail.

In FIG. 4, the exhaust pipe 3 of the engine 1 is provided with a reducing agent feed port 70 which is located just on the upstream of the electrochemical catalyst 5.

The fuel tank 71 is provided with a canister 72 for adsorbing the main component HC of fuel (gasoline).

The canister 72 is communicated with the reducing agent feed port 70 through a reducing agent feed control valve 73 in order to feed the atomized fuel HC from the fuel tank 71 as the NOx reducing agent into the exhaust pipe 3 under the control of the reducing agent feed control valve 73.

The amount of feeding the NOx reducing agent HC is adjusted by controlling the time in which the reducing agent feed control valve 73 is opened depending upon the additional HC feed amount PHC (see step 115 in FIG. 3).

Embodiment 3

In the above embodiment 2, the atomized gas HC of fuel from the fuel tank 71 was used as the NOx reducing agent. However, fuel itself in the fuel tank 71 may be used as the NOx reducing agent.

Figure 5:
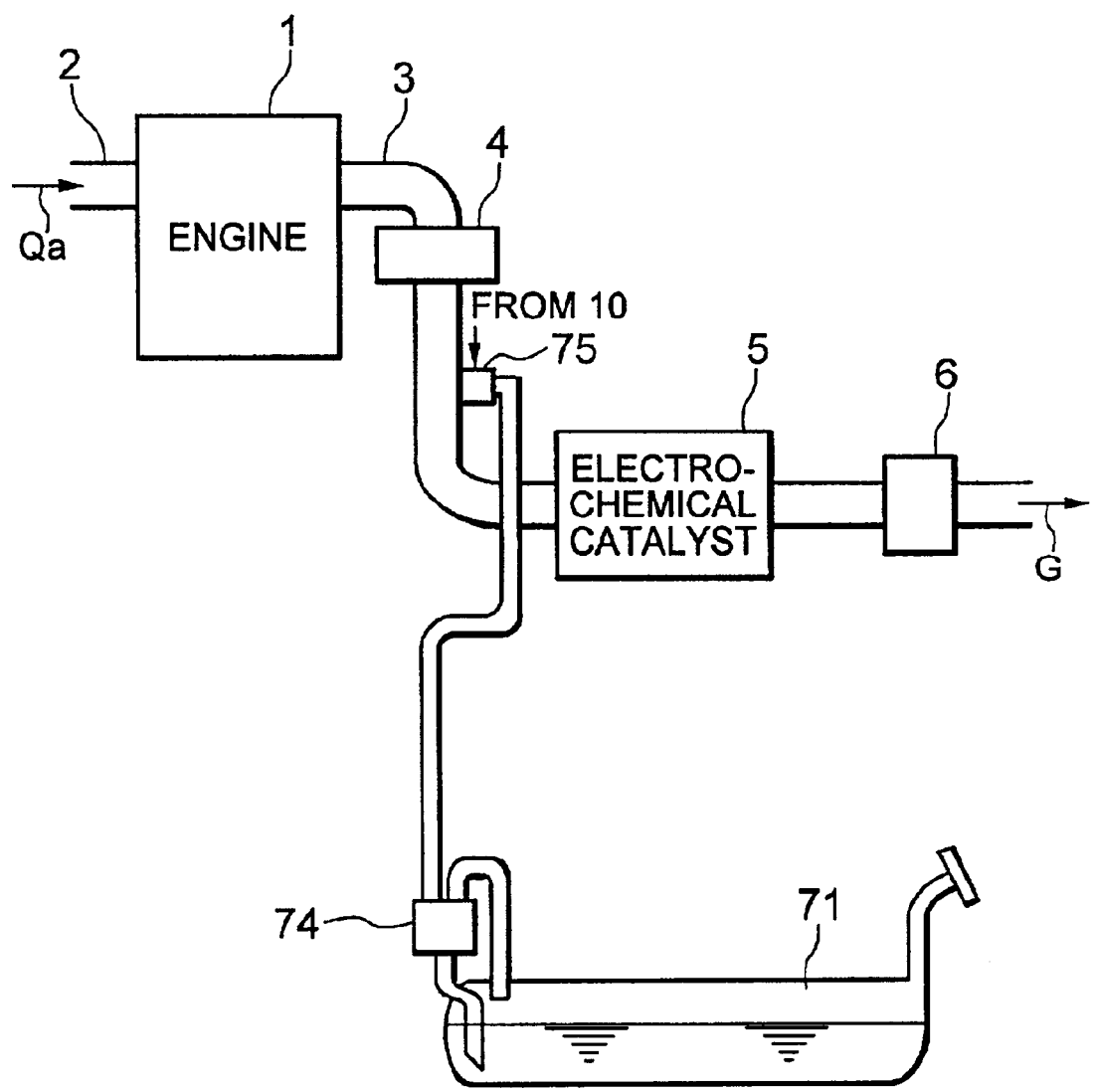
FIG. 5 is a diagram illustrating the constitution of the reducing agent feeding device according to an embodiment 3 of the present invention.

FIG. 5 is a diagram illustrating the constitution of the periphery of the reducing agent feeding device 7 according to the embodiment 3 of the invention using the fuel itself as the NOx reducing agent. The same portions as those described above are denoted by the same reference numerals but are not described here again in detail.

In FIG. 5, a fuel pump 74 is installed at an upper part (or inside) of the fuel tank 71 so as to feed the fuel which is adjusted to assume a predetermined pressure.

A reducing agent feeding injector 75 is communicated with the fuel pump 74, and is provided in the exhaust pipe 3 so as to be located just on the upstream of the electrochemical catalyst 5.

The reducing agent feeding injector 75 feeds, as the NOx reducing agent, the fuel HC of which the pressure is adjusted from the upstream side of the electrochemical catalyst 5.

In the case of the reducing agent feeding device 7 constituted as shown in FIG. 5, the feeding amount of the reducing agent is adjusted by controlling the time for driving the reducing agent feeding injector 75 depending upon the additional HC feed amount PHC (see step 115 in FIG. 3).

Embodiment 4

In the above embodiment 3, the fuel itself in the fuel tank 71 was used as the NOx reducing agent. It is, however, also allowable to reform the fuel HC into $H_2$ to use it as the NOx reducing agent.

Figure 6:
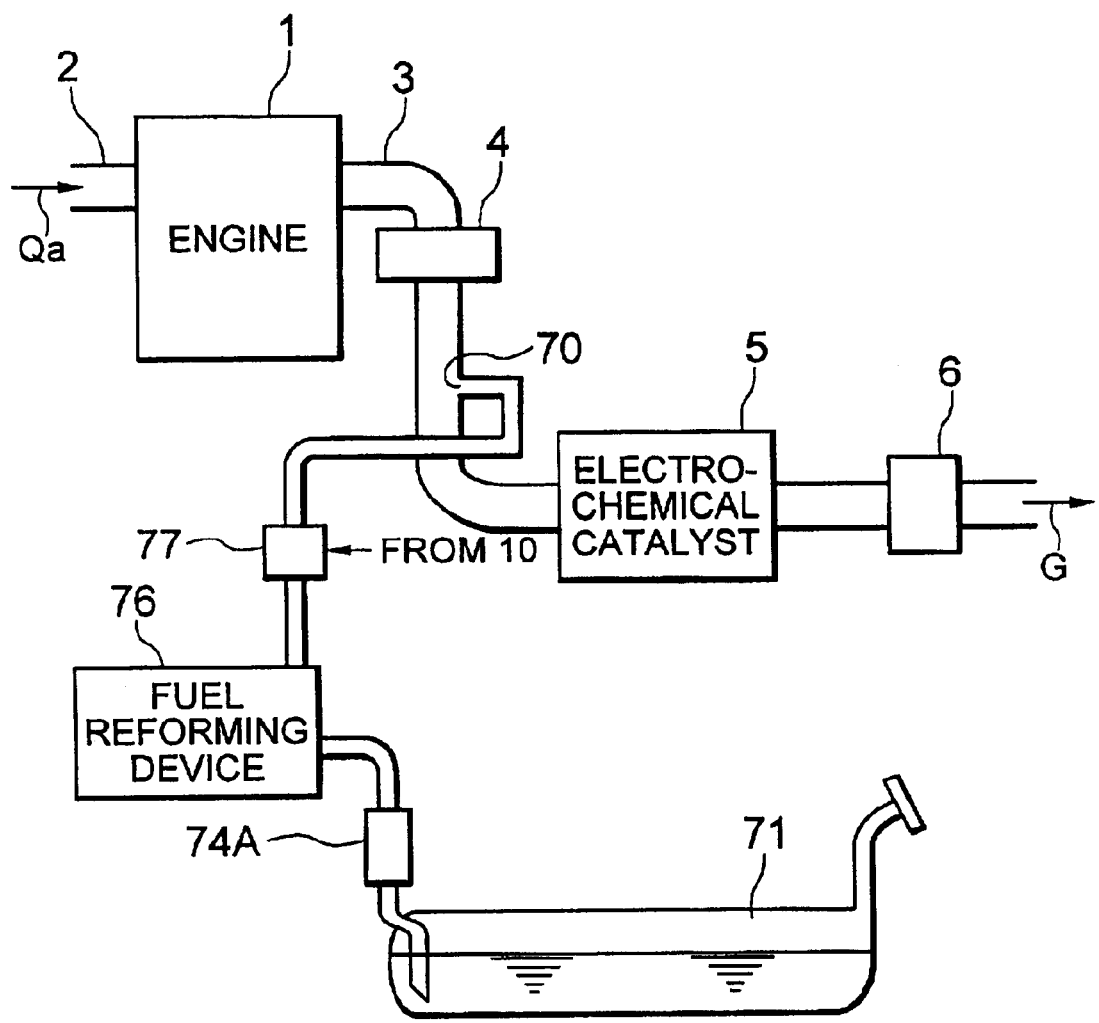
FIG. 6 is a diagram illustrating the constitution of the reducing agent feeding device according to an embodiment 4 of the present invention.

FIG. 6 is a diagram illustrating the constitution of the periphery of the reducing agent feeding device 7 according to the embodiment 4 of the invention using the fuel that is reformed as the NOx reducing agent. The same portions as those described above are denoted by the same reference numerals or by attaching "A" to the ends of the numerals but are not described here again in detail.

In FIG. 6, a fuel pump 74A installed at an upper part (or inside) of the fuel tank 71 feeds the fuel adjusted to a predetermined pressure to a fuel reforming device 76.

The fuel reforming device 76 reforms the fuel HC that is fed into $H_2$ and feeds it, as the NOx reducing agent, to the reducing agent feed port 70 through the feed amount control device 77.

The feed amount control device 77 adjusts the amount of feeding the NOx reducing agent $H_2$ after reformed depending upon the additional HC feed amount (see step 115 in FIG. 3).

According to the above-mentioned embodiments 2 to 4, the NOx emission amount can be efficiently decreased in the lean mode operation of the engine 1 like in the above-mentioned embodiment 1.

What is claimed is:

1. A device for purifying exhaust gas of an internal combustion comprising:

first and second three-way catalysts for purifying exhaust gas in an exhaust system of the internal combustion engine;

an electrochemical catalyst interposed between the first and second three-way catalysts, said electrochemical catalyst including an electron conducting substance and an ion conducting substance for promoting an oxidizing reaction and an reducing reaction by the conduction of ions and electrons to thereby electrochemically purify the exhaust gas in the exhaust system.

2. A device for purifying exhaust gas of an internal combustion engine according to claim 1, wherein the internal combustion engine is controlled for its operation in a lean mode.

3. A device for purifying exhaust gas of an internal combustion engine according to claim 1, wherein said electrochemical catalyst contains at least one of a NOx occluding member and an HC adsorbing member.

4. A device for purifying exhaust gas of an internal combustion engine according to claim 3, further comprising a reducing agent feeding disposed on the upstream of said electrochemical catalyst to feed a NOx reducing agent into the exhaust system.

5. A device for purifying exhaust gas of an internal combustion engine according to claim 4, therein said reducing agent feeding device feeds an atomized gas of fuel from a fuel tank as the NOx reducing agent.

6. A device for purifying exhaust gas of an internal combustion engine according to claim 5, wherein said reducing agent feeding device includes:

a canister for adsorbing the atomized gas of fuel; and a reducing agent feed control valve for feeding the atomized gas of fuel adsorbed by the canister to the exhaust system of the internal combustion engine as the NOx reducing agent, wherein the time for opening the reducing agent feed control valve is controlled depending upon the amount of the NOx reducing agent required by said electrochemical catalyst.

7. A device for purifying exhaust gas of an internal combustion engine according to claim 4, further comprising:

exhaust gas amount estimating means for estimating the amount of the exhaust gas containing NOx, HC and CO exhausted into the exhaust system of the internal combustion engine;

electrochemical catalyst state judging means for judging the active state of the electrochemical catalyst based upon the temperature data of the electrochemical catalyst; and reducing agent feed judging means for estimating the reacting state of the electrochemical catalyst with the NOx relying upon the active state of the electrochemical catalyst, reaction rate thereof and storage of the exhaust gas by the electrochemical catalyst, and for judging whether the NOx reducing agent needs be fed based upon the values estimated by the exhaust gas amount estimating means;

wherein when it is so judged that the NOx reducing agent needs be fed, said reducing agent feed judging means drives said reducing agent feeding device.

8. A device for purifying exhaust gas of an internal combustion engine according to claim 7, wherein provision is made of sensor means for detecting at least one operating condition out of the rotational speed of the internal combustion engine, load condition and cooling water temperature, and wherein the exhaust gas amount estimating means estimates the amount of the exhaust gas depending upon the operating condition of the internal combustion engine.

9. A device for purifying exhaust gas of an internal combustion engine according to claim 4, wherein said reducing agent feeding device feeds the fuel in the fuel tank as the NOx reducing agent.

10. A device for purifying exhaust gas of an internal combustion engine according to claim 9, wherein said reducing agent feeding device includes:

a fuel pump for feeding the fuel in the fuel tank while adjusting the pressure thereof to assume a predetermined value; and a reducing agent feeding injector for feeding the fuel from the fuel pump as the NOx reducing agent into the exhaust system of the internal combustion engine; wherein, the time for driving said reducing agent feeding injector is controlled depending upon the amount of the NOx reducing agent required by said electrochemical catalyst.

11. A device for purifying exhaust gas of an internal combustion engine according to claim 4, wherein said reducing agent feeding device feeds the fuel after reformed as the NOx reducing agent.

12. A device for purifying exhaust gas of an internal combustion engine according to claim 11, wherein said reducing agent feeding device includes:

a fuel pump for feeding the fuel in the fuel tank while adjusting the pressure thereof to assume a predetermined value;

a fuel reforming device for reforming the fuel fed from the fuel pump into $H_2$; and a feed amount control device for feeding hydrogen as the NOx reducing agent into the exhaust system of the internal combustion engine; wherein, the feeding amount of the NOx reducing agent is controlled by said feed amount control device depending upon the amount of the NOx reducing agent required by said electrochemical catalyst.

\* \* \* \* \*